United States Patent [19]
Betts et al.

[11] Patent Number: 5,982,826
[45] Date of Patent: Nov. 9, 1999

[54] SYNCHRONOUS CLOCK REGENERATION SYSTEM FOR GENERATING A CLOCK WAVEFORM AT A SPECIFIED FREQUENCY

[75] Inventors: William Lewis Betts, St. Petersburg; Keith Alan Souders, Tampa, both of Fla.

[73] Assignee: Paradyne Corporation, Largo, Fla.

[21] Appl. No.: 08/842,188

[22] Filed: Apr. 23, 1997

[51] Int. Cl.[6] .................................. H04L 7/00; H04B 1/38
[52] U.S. Cl. .................... 375/354; 375/222; 375/371; 327/162; 395/551
[58] Field of Search ................................. 375/222, 371, 375/354, 373, 355, 219, 344; 327/141, 162, 163, 41, 40, 165; 395/551; 455/75, 76, 260, 313, 323

[56] References Cited

U.S. PATENT DOCUMENTS

| | | | |
|---|---|---|---|
| 4,866,647 | 9/1989 | Farrow | 364/724.1 |
| 5,051,981 | 9/1991 | Kline | 370/32.1 |
| 5,513,209 | 4/1996 | Holm | 375/354 |
| 5,546,032 | 8/1996 | Yatagai | 327/165 |
| 5,754,607 | 5/1998 | Powell et al. | 375/373 |

*Primary Examiner*—Stephen Chin
*Assistant Examiner*—Betsy L. Deppe
*Attorney, Agent, or Firm*—Thomas, Kayden, Horstemeyer & Risley, L.L.P.

[57] ABSTRACT

A synchronous clock regeneration system is implemented in a modem to enable the generation of a clock waveform at the same frequency as that of the transmitting device. The synchronous clock regeneration system receives an error signal indicating the timing difference in the receiving modem and the remote modem. The value in the error signal is added to a value in an offset integrator which integrates all of the error signals produced in a given transmission. The data is then relayed to a modulo subtractor which subtracts a predetermined value from the data if the value of the data is greater than the predetermined value. The data is then introduced to the offset integrator for integration and to a waveform generator. The waveform generator uses the data to offset a supply waveform an appropriate amount to match the frequency of the remote modem. As a result, the waveform generator produces a waveform that synchronously and smoothly tracks the clock waveform generated by the remote modem.

22 Claims, 7 Drawing Sheets

SYNCHRONOUS CLOCK REGENERATION SYSTEM FOR GENERATING A CLOCK WAVEFORM AT A SPECIFIED FREQUENCY

FIELD OF THE INVENTION

The present invention generally relates to telephone and modems and, in particular, to a system and method of regenerating a clock waveform within a receiving modem using an independent source as a supply signal.

BACKGROUND OF THE INVENTION

Modems transmit and receive digital data to and from a network system, such as the general switch telephone network (GSTN). Typically, a network will communicate a string of digital data for every oscillation of its internal clock crystal. A string of digital data often represents a "symbol," and the number of symbols communicated in one second is referred to as the "symbol rate." It should be noted that a string of digital data may be a single bit or multiple bits of data information. Many modems demodulate data at a symbol rate different from that of the network's symbol rate and different from that of the symbol rates of other modems. Therefore, most modem designs include techniques for interpolating or decimating data from one symbol rate into the symbol rate used by the receiving modem. When demodulating information from a remote modem with a different symbol rate, it is desirable for the receiving modem to generate a clock waveform having the same frequency, and hence symbol rate, as that of the remote modem.

Conventional modems generate a clock waveform through a hardware device capable of receiving a supply signal and offsetting the supply signal to generate a clock waveform. In most conventional modem designs, this waveform generator is supplied by a signal within the receiving modem that has already been interpolated or decimated to correct for the timing differences between the remote modem and the receiving modem. Therefore, the signal supplying the waveform generator contains the necessary information for the waveform generator to match the frequency of the remote modem. However, it is desirable for the waveform generator to be supplied from an independent source rather than from a signal within the receiving modem. As used herein, an "independent source" is any source other than the receiving modem that generates a supply signal for the waveform generator. For example, it is desirable for the waveform generator to be supplied by a signal directly from a network in communication with the receiving modem. However, since a signal from such an independent source has not already been interpolated or decimated to correct for the timing differences between the receiving modem and the remote modem, a supply waveform from the independent source contains no information indicating how much the waveform generator should offset the supply signal in order to match the clock frequency of the remote modem.

Thus, a heretofore unaddressed need exists in the industry for providing a system and method for regenerating a synchronous clock waveform in a receiving modem using a supply waveform from an independent source.

SUMMARY OF THE INVENTION

The present invention overcomes the inadequacies and deficiencies of the prior art as discussed herein. The present invention provides for a synchronous clock regenerating system and method that can be employed within a receiving modem.

The synchronous clock regeneration system and method utilize a modulo subtractor, an offset integrator, a waveform generator, and an adder. The adder is preferably configured to receive an error signal containing a value which indicates the amount that the symbol rate of the remote modem differs from that of the receiving modem. The adder is configured to combine the error signal with a value from an offset integrator. A modulo subtractor is configured to subtract a predetermined value from this combined signal if the combined signal is greater than half of the predetermined value or to add a predetermined value if the combined signal is less than half of the negative of the predetermined value. An offset integrator is configured to integrate the values produced by the modulo subtractor. A waveform generator is configured to receive a source waveform from an independent source and to receive the values produced by the modulo subtractor. The waveform generator is further configured to generate a clock waveform that synchronously tracks the symbol rate of the remote modem.

In accordance with another feature of the present invention, the synchronous clock regeneration system and method may also include multipliers to multiply scaling values and reciprocals of scaling values to the signals being manipulated by the synchronous clock regeneration system and method. This operation may reduce the amount of quantization error produced by the synchronous clock regeneration system and method.

The synchronous clock regeneration system and method of the invention have many advantages, a few of which are delineated hereafter, as examples.

An advantage of the synchronous clock regeneration system and method is that they provide for a scheme for generating a synchronous clock waveform that matches the frequency used by a remote modem. The generated clock waveform smoothly tracks the frequency of the remote modem and contains no sudden jumps in frequency.

Another advantage of the synchronous clock regeneration system and method is that they allow an independent source to provide the supply waveform. This allows the synchronous clock regeneration system and method, for example, to use a supply waveform generated by the network interfaced with the receiving modem.

Other features and advantages of the invention will become apparent to one skilled in the art upon examination of the following drawings in the detailed description. It is intended that all such additional features and advantages be included herein within the scope of the invention, as is defined by the claims.

BRIEF DESCRIPTION OF THE DRAWINGS

The invention can be better understood with reference to the following drawings. The elements of the drawings are not necessarily to scale, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
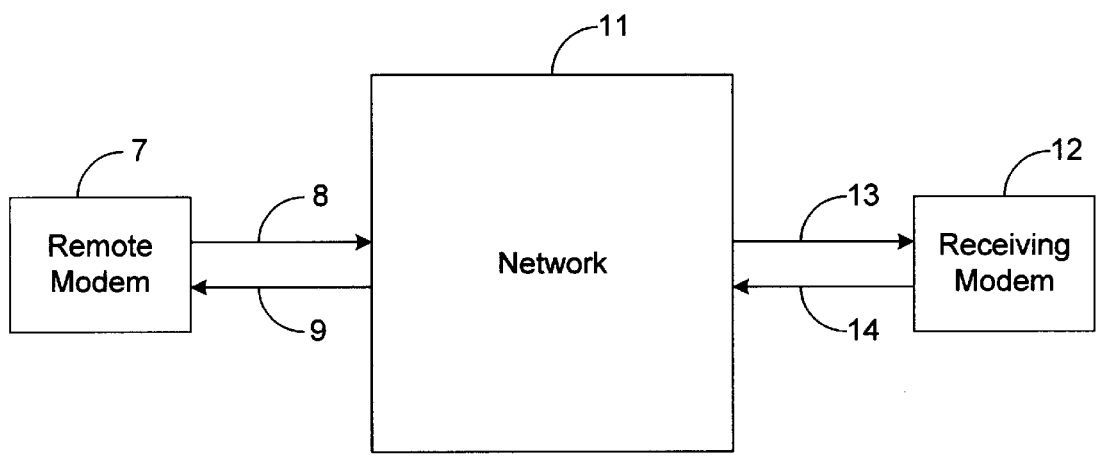
FIG. 1 is a block diagram illustrating a possible implementation of a receiving modem in accordance with the prior art.

With reference to FIG. 1, a remote modem 7, through connections 8 and 9, are interfaced with a network 11. The remote modem 7 transmits information to the network 11 which eventually relays the information to a receiving modem 12 interfaced with the network 11 through connections 13 and 14. As can be seen with reference to FIG. 2, a conventional receiving modem 12 passes information through a receive interpolator/decimator 15 or a transmit interpolator/decimator 16 when communicating with the network 11. Many times network 11 processes and communicates data at one rate while receiving modem 12 demodulates data at an entirely different rate. For example, a telephone network typically communicates data with a modem 12 at 8000 Hz (Hertz) while the modem 12 processes the data at rate such as 2400 Hz. In this example, the modem's 12 sample rate (8000 Hz) differs from the modem's 12 symbol rate (2400 Hz) by a factor of approximately 3. However, it should be noted that the present invention is not limited to this example, and generally any range of data rates are possible.

When modem 12 is transmitting, transmit encoder 17 is configured to transmit data across connection 18 to transmit interpolator/decimator 16. As is known in the art, interpolator/decimator 16 interpolates and/or decimates the data from the modem's symbol rate to the network's symbol rate. Accordingly, the data transmitting out of transmit interpolator/decimator 16 across connection 14 to the network 11 is at the same rate as that of network 11.

When modem 12 is receiving, modem 12 receives data from the network 11 across connection 13. This data is originally transmitted from another device such as a remote modem 7 transmitting data across connection 8 to the network 11. The receive interpolator/decimator 15 interpolates and/or decimates the data from the symbol rate used by network 11 to the symbol rate used by modem 12. As is known in the art, transmission of data from modem 12 typically causes an echo signal to be included in the data received by modem 12 across connection 13. Therefore, while transmitting, the transmit encoder 17 is designed to relay an echo signal to subtractor 26 across connection 28. Subtractor 26 is configured to subtract the echo signal from the data interpolated and/or decimated by receive interpolator/decimator 15 and to relay the data across connection 32 to filter 34, which is configured to filter noise from the signal. Usually, the signal then is relayed across connection 36 to multiplier 38 which is configured to multiply the signal times a specified carrier frequency waveform ($f_c$) located on connection 39. The signal is then relayed across connection 42 to a timing interpolator 44. The timing interpolator 44 is designed to interpolate the signal to correct for any differences that may exist between the rate used by receiving modem 12 and remote modem 7. Therefore, the data relayed from the timing interpolator 44 to the equalizer demodulator 46 across connection 48 is at the correct frequency for demodulation by modem 12. By techniques well known in the art, equalizer demodulator 46 is configured to equalize and demodulate the signal and to output the results across connection 52 for use by any system capable of interfacing with modem 12.

In order for timing interpolator 44 to correct for the timing difference in receiving modem 12 and remote modem 7, the output of timing interpolator 44 is relayed to a baud timing update device (hereinafter referred to as "BTUD") 54 via connection 55. The BTUD 54 is configured to use an algorithm to calculate the difference between the symbol rate used by modem 12 and remote modem 7. An error signal indicating this calculated value is then relayed to multiplier 56 through connection 58. Multiplier 56 is designed to multiply this error signal times a value located on connection 59. This value should be equivalent to the integer multiple of the sample rate used by modem 12 divided by the symbol rate of modem 12, and, typically, modems use a sample rate three or four times their symbol rate.

The output of multiplier 56 is relayed along connection 64 to adder 66 where a value from delay integrator 68 is added to the output of the multiplier 56 via connection 72. The output of adder 66 is relayed to modulo subtractor 74 via connection 76. Modulo subtractor 74 is configured to subtract the value of $2^n$ (where n is the number of bits used to define each sample within modem 12) from the signal entering modulo subtractor 74 from connection 76 when the value of this signal is greater than the value of $(0.5+a)*2^n$. As is known in the art, the value of "a" is set to provide the operation with hysteresis to ensure that the value of $2^n$ is subtracted only when the value in modulo subtractor 74 surpasses half of the value of $2^n$. Typically, it is sufficient to use the value of 0.1 for the value of "a." After subtracting $2^n$ from the signal, modulo subtractor 74 is designed to send an add impulse to the timing interpolator 44 via connection 78 and to relay the resulting value to delay integrator 68 through connection 82.

If the value of the signal entering modulo subtractor 74 is more negative than the value of $(-0.5-a)*2^n$, then modulo subtractor 74 is designed to add a value of $2^n$ to the signal. Again, the value used for "a" should be sufficient to provide for proper hysteresis of the operation. After adding $2^n$ to the signal, modulo subtractor 74 is designed to send a delete impulse to the timing interpolator 44 via connection 78 and to relay the resulting value to delay integrator 68 through connection 82.

If the signal entering modulo subtractor 74 from connection 76 is less than the value of $(0.5+a)*2^n$, and is greater than the value of $(-0.5-a)*2^n$, then modulo subtractor 74 is configured to merely relay the signal to connection 82. It should be noted that operation of the timing interpolator is fully disclosed in a patent by U.S. Pat. No. 4,866,647 to C. W. Farrow entitled "Continuously Variable Digital Delay Circuit," the disclosure of which is incorporated herein by reference.

Delay integrator 68 is designed to store the value of the signal on connection 82. The new value in delay integrator 68 is then relayed to adder 66 via connection 72 and relayed to the tiring interpolator 44 via connection 84. By techniques known in the art, timing interpolator 44 is configured to use the feedback signals on connection 84 and connection 78 to delay the phase of the sample being demodulated by modem 12 an appropriate amount to match the sample rate of modem 12. The end result is a signal transmitted to equalizer demodulator 46 at exactly the symbol rate used by modem 12

Since remote modem 7 is operating at a different frequency and, hence, symbol rate, it is desirable for receiving modem 12 to generate a clock waveform at the symbol rate of remote modem 7. A conventional modem 12 uses a waveform generator 86 to do this. Waveform generator 86 is any device capable of offsetting a supply waveform an appropriate amount in order to output a waveform at a specific frequency. An example of such a device is AT&T's commercially available V32-INTF Datapump Interface Device. Waveform generator 86 is driven by the output of multiplier 56 via adder 85 and connection 88 as a source waveform, and the source waveform contains information indicating the timing difference between modem 12 and remote modem 7. Offset integrator 83 is designed to store the previous output on connection 88 via connection 89. Adder 85 is designed to add the previous output from offset integrator 83 via connection 93 to the signal on connection 91 thereby integrating the phase error signal from multiplier 56. Since the waveform has already passed through timing interpolator 44, the source waveform's frequency should be equal to that of modem 12.

However, as indicated hereinbefore, it is advantageous to use a waveform from a different source, such as network 11, as a supply waveform for waveform generator 86. The synchronous clock regeneration system 100 of the present invention allows for this to occur.

The synchronous clock regeneration system 100 of the invention can be implemented in software, hardware, or a combination thereof. In the preferred embodiment, as illustrated by way of example in FIG. 3, the synchronous clock regeneration system 100 of the present invention along with its associated methodology is implemented in software and stored in computer memory 101 of a modem 103. Note that the synchronous clock regeneration system 100 can be stored on any computer-readable medium for use by or in connection with a computer-readable system or method. In the context of this document, a computer-based medium is an electronic, magnetic, optical, or other physical device or means that can contain or store a computer program for use by or in connection with a computer-related system or method.

Figure 3:
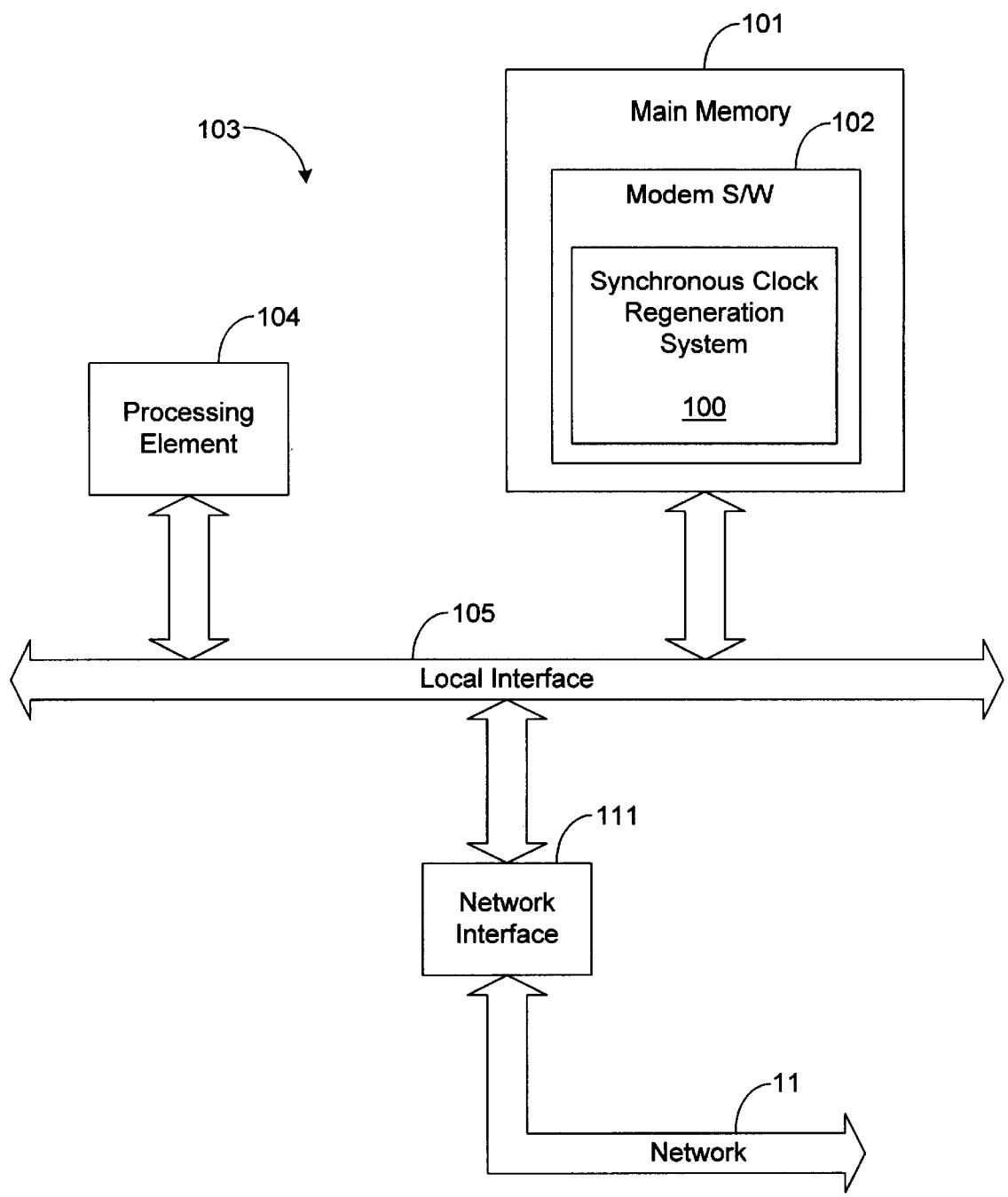
FIG. 3 is a block diagram illustrating a possible implementation of a modem that employs a synchronous clock regeneration system in accordance with the present invention.

The preferred embodiment of the modem 103 of FIG. 3 comprises one or more conventional processing elements 104, such as a digital signal processor (DSP), that communicate to the other elements within the modem 103 via a local interface 105, which can include one or more buses. Furthermore, the modem 103 includes a network interface 111 that allows the modem 103 to exchange data with the network 11. Modem software 102, which includes the synchronous clock regenerator system 100, is executed by the processing element(s) 104 in order to accomplish the functionality of the modem 103.

Figure 2:
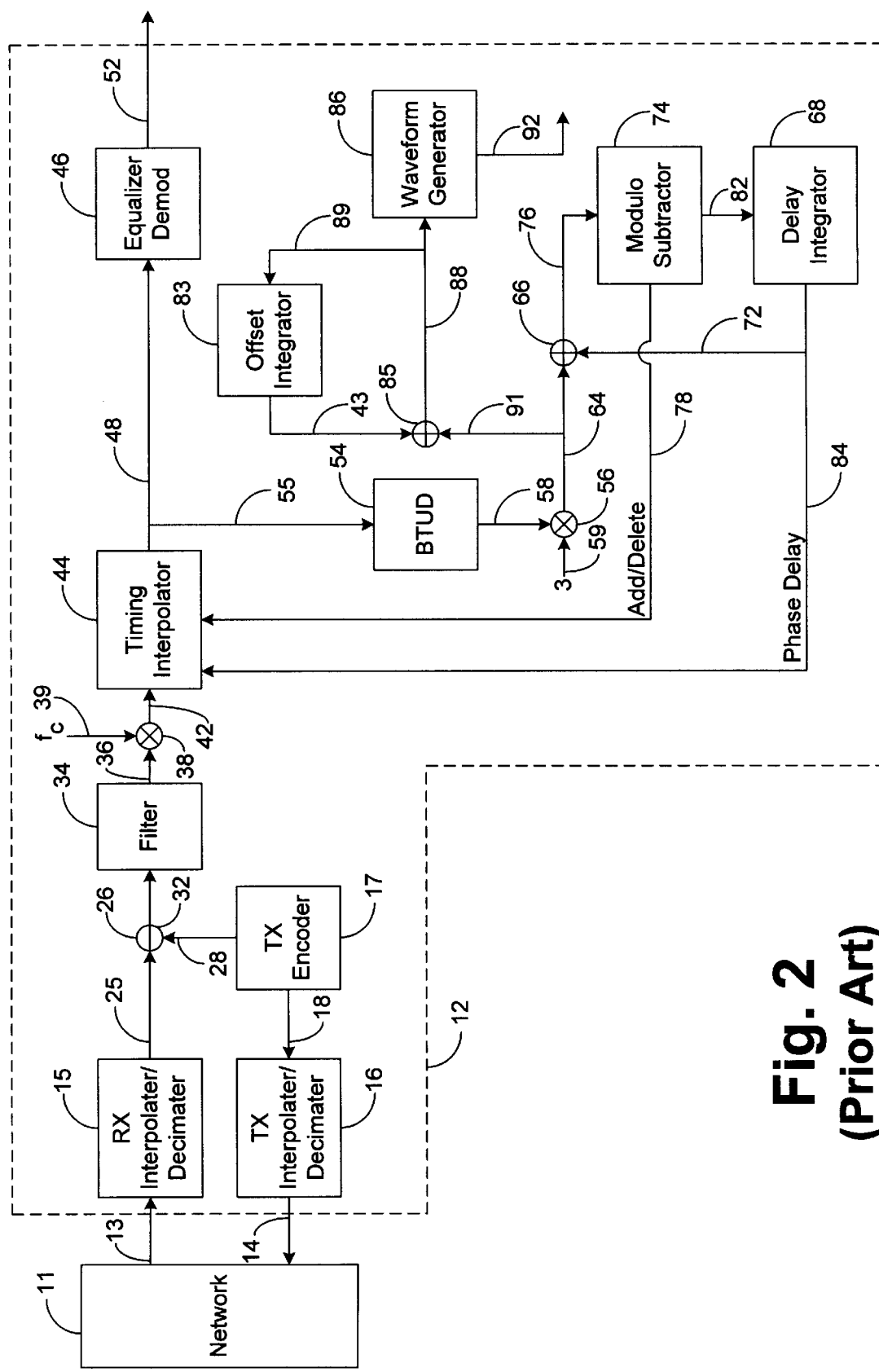
FIG. 2 is a block diagram illustrating a possible implementation of a receiving modem that regenerates a synchronous waveform using the receiving modem's own signal as a supply waveform in accordance with the prior art.
Figure 4:
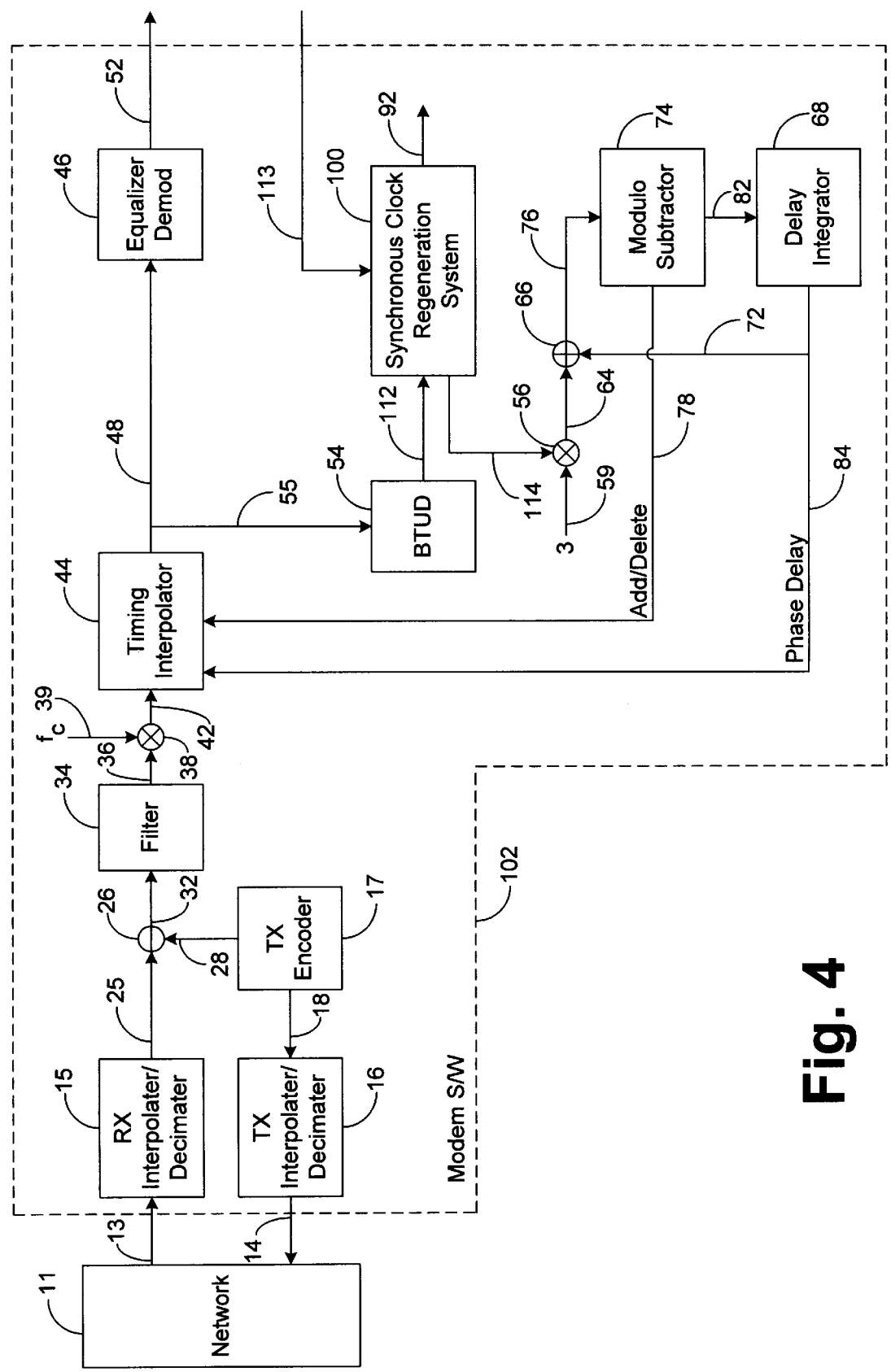
FIG. 4 is a block diagram illustrating a possible implementation of modem software for implementing the synchronous clock regeneration system of the present invention within a receiving modem.

FIG. 4 is a block diagram illustrating the architecture and functionality of the modem software 102 (FIG. 3). As can be seen by reference to the preferred embodiment in FIG. 4, the error signal from BTUD 54 is introduced to the synchronous clock regeneration system 100 through connection 112. The synchronous clock regeneration system 100 is supplied by a source waveform from an independent source, such as network 11, through connection 113, and a clock waveform matching the frequency of remote modem 7 is regenerated along connection 92. The same information relayed to multiplier 56 via connections 58 and 59 of FIG. 2 is relayed from the synchronous clock regeneration system 100 of FIG. 3 along connection 114.

Figure 5:
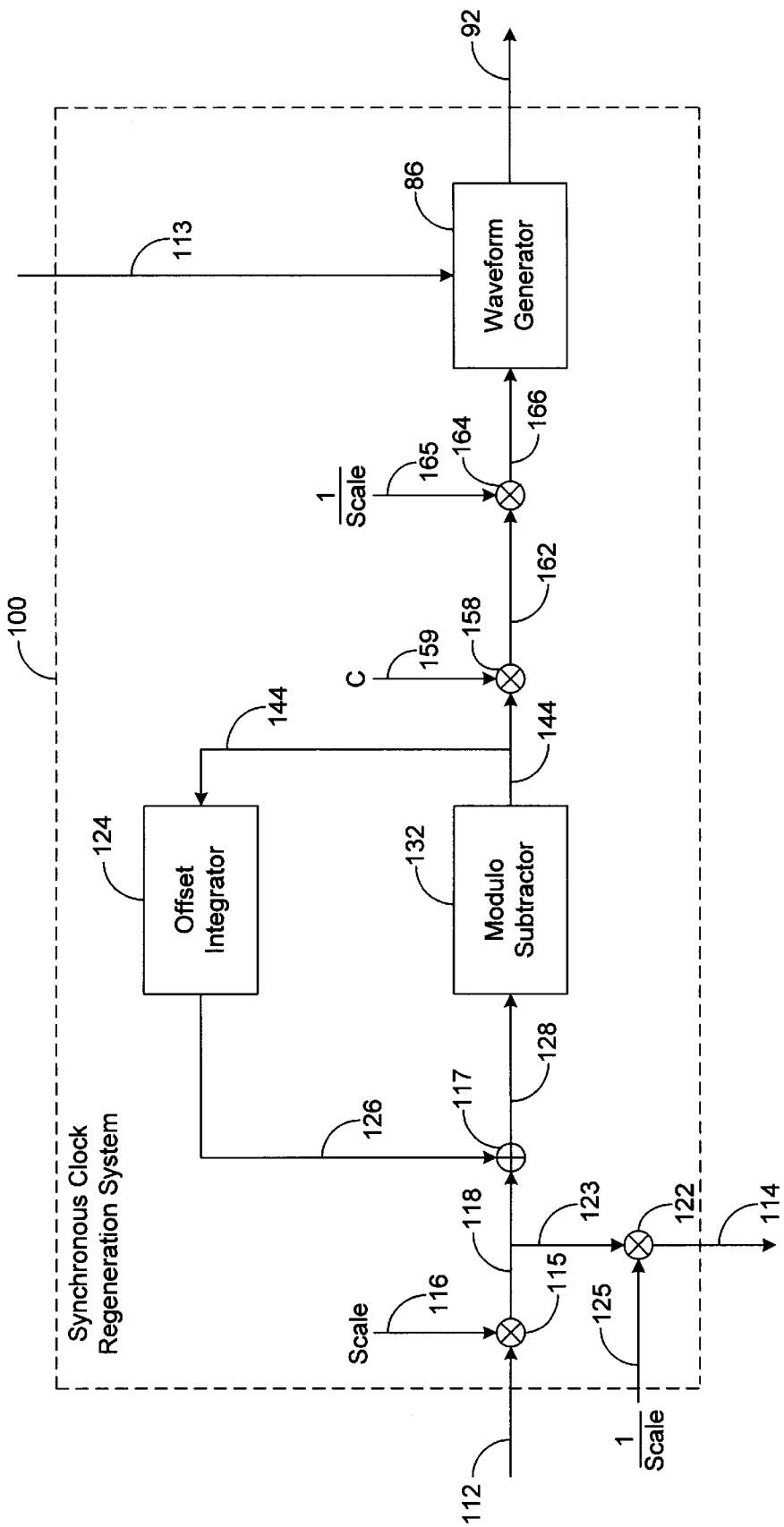
FIG. 5 is a block diagram illustration a possible implementation of the synchronous clock regeneration system of FIG. 4.

The preferred embodiment of the synchronous clock regeneration system 100 is depicted in FIG. 5. With reference to FIG. 5, the error signal received by the synchronous clock regeneration system 100 is scaled in order to minimize quantization error. This is done by relaying the error signal to multiplier 115 which is configured to multiply the error signal times a scaling factor from connection 116. The value of the scaling factor used will be further discussed hereinbelow. The output of multiplier 115 is relayed to adder 117 via connection 118 and multiplier 122 via connection 123. Multiplier 122 is designed to remove the scale introduced in multiplier 115 by multiplying the signal times the value on connection 125 which contains the reciprocal of the scaling factor used in multiplier 115. This scaling error should assure identical quantization error on connections 114 and 118 without changing the gain of signals on connection 114 relative to the signals on connection 112. The signal is then relayed on connection 114 for the same process mentioned hereinbefore as in conventional modem 12.

Figure 6:
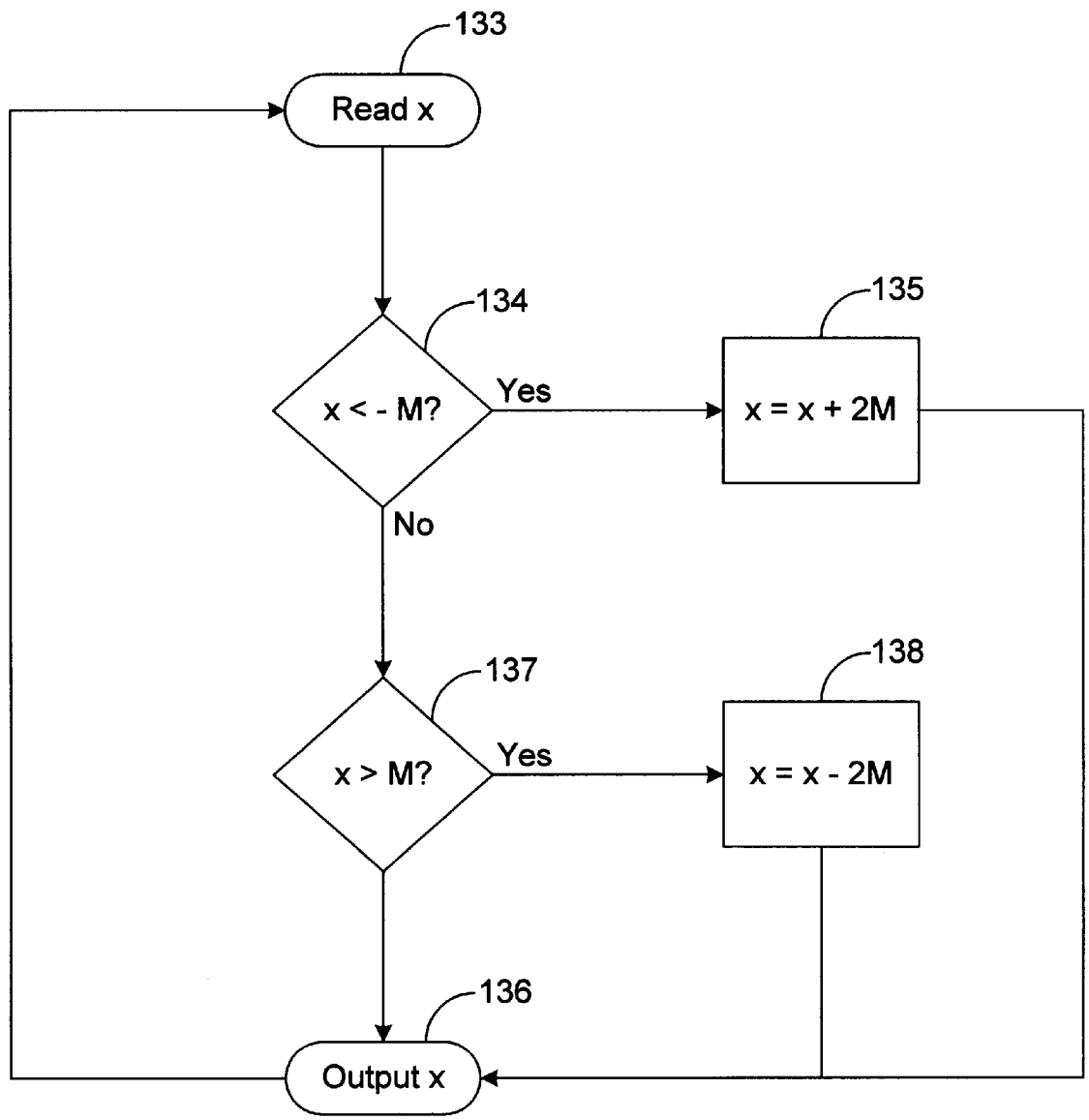
FIG. 6 is a flow chart illustrating an example of operation of the modulo subtractor of FIG. 5.

Adder 117 is configured to add the value of the scaled error signal on connection 118 to the value in offset integrator 124 which is introduced to adder 117 through connection 126. Initially, the offset signal on connection 126 is zero as will be discussed hereinbelow. The signal is then transmitted across connection 128 to modulo subtractor 132. The functionality of modulo subtractor 132 is depicted in FIG. 6. As indicated in blocks 133 and 134, modulo subtractor 132 is configured to initially read the value, "x," from the signal on connection 128 and to check to see if the value on this signal is less than the value of −M, where M is a specified constant that will be further discussed hereinbelow. If the signal is less than the value of −M, then block 135 shows that the value of 2M is added to x before the signal is relayed to block 136. If the signal is greater than the value of −M, then the signal is relayed to block 137 where the signal is checked to see if it is greater than the value of M. If x is greater than the value of M, then the value of 2M is subtracted from x in block 138 before the signal is relayed to block 136. Otherwise, the signal in block 137 is relayed directly to block 136. Once in block 136, the signal is output from the modulo subtractor 132, and modulo subtractor 132 is designed to wait for the next input to repeat the steps outlined hereinabove.

Figure 7:
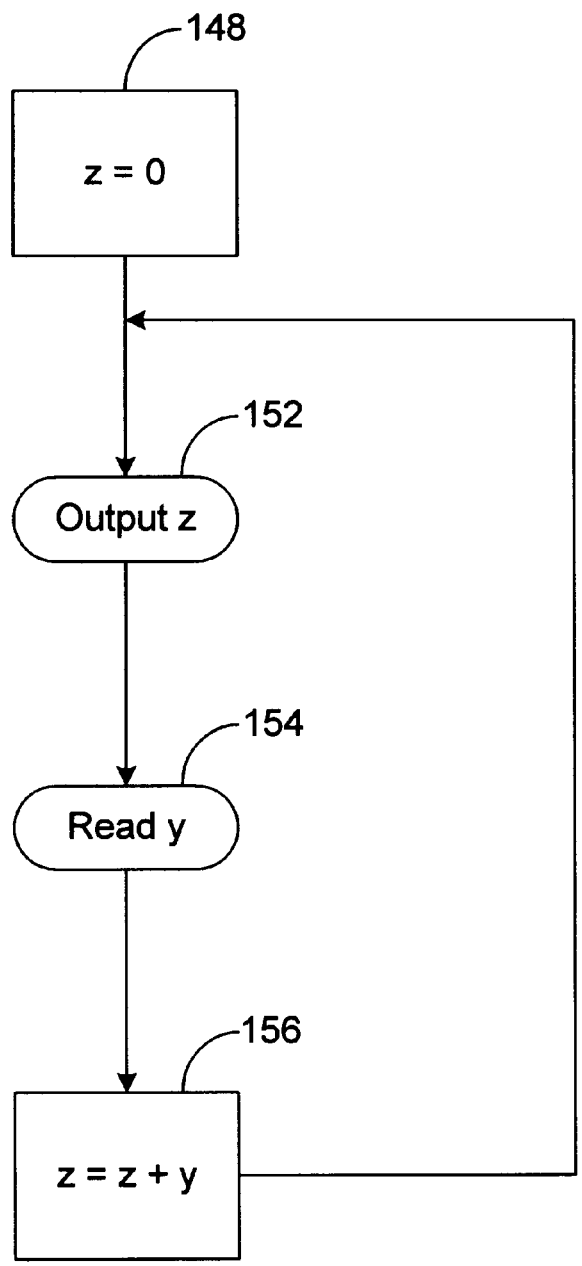
FIG. 7 is a flow chart illustrating an example of operation of the offset integrator of FIG. 5.

Once a signal is output from modulo subtractor 132, connection 144 relays the signal to offset integrator 124. As can be seen with reference to FIG. 7, which depicts the functionality of offset integrator 124 and adder 117, offset integrator 124 is configured to store the previous output of modulo subtractor 132 and to initially output a value of zero at blocks 148 and 152. However, at blocks 154 and 156, adder 117 is designed to read a value, "y," which is input from connection 118 and to add this value to the value already in the offset integrator 124. Offset integrator 124 is configured to receive and store this new value. Offset integrator 124 is further configured to then output this new value on connection 126 for the next set of data, and the process is repeated. In this way the offset integrator 124 is designed to continually integrate the scaled error signals transmitted by BTUD 54.

The output of modulo subtractor 132 is not only relayed to offset integrator 124, but it is also relayed to multiplier 158 through connection 144. Multiplier 158 is configured to multiply the waveform times a scaling factor, C, from connection 159. The following table depicts the value of scaling factor C for typical symbol rates under the International Telecommunications Union's Standard V.34:

TABLE

| Symbol Rate | P | I | C (hex) | Scale | M (hex) |
|---|---|---|---|---|---|
| 3429 | 7 | 3 | 12ab | 1 | 6000 |
| 3200 | 5 | 2 | 1400 | 1 | 4000 |
| 3000 | 8 | 3 | 1555 | 1 | 3000 |
| 2800 | 20 | 7 | 16db | 1 | 7000 |
| 2743 | 35 | 12 | 1755 | 1/16 | 3000 |
| 2400 | 10 | 3 | 1aab | 1 | 3000 |

In order to calculate the above values, the ratio of the time slot rate, for example 8000, in connection 13 to the symbol rate of modem 103 is determined. This ratio is expressed in a form that is a ratio of the smallest possible integers. The numerator of the resulting ratio is designated as P, and the denominator is designated as I. P/I is an integer multiple of the sample rate of modem 103 divided by its symbol rate. The value of C is determined by multiplying the value of P/I times the value of $2^b$, where b is the number of bits defining the signal. For the purpose of the above table, a value of 11 was used for b. The actual values in the above table are for illustrative purposes only, and any suitable values may be used instead.

It should be noted that multiplier 158, which multiplies C to the signal, is an integer multiplier such as AT&T's commercially available DSP-16A Digital Signal Processor. Many times, the multiplication of C to the signal generates a result greater than the number of bits capable of being received by waveform generator 86. As is known in the art, multiplier 158 keeps the most significant number of bits (upper bits) which match the input of waveform generator 86. For example, if waveform generator 86 requires an 11 bit input, multiplier 158 keeps the upper 11 bits of the value of C times the signal in multiplier 158.

Referring to the table hereinabove, "scale" is the value multiplied times the error signal by multiplier 115. As is known in the art, the value of 1/16 is used at the symbol rate of 2743 to avoid double precision in a 32 bit offset integrator 124. Furthermore, the value of M used in modulo subtractor 132 can be determined by multiplying a value, k, times $2^{b+1}$. In this example, k is to the smallest integer i multiplied times I multiplied times scale. The values of I and scale are in the above table, and i is any integer for the case where P is even or any even integer for the case where P is odd.

After multiplying the scaling factor C times the signal in multiplier 158 according to the above table, the signal is then relayed across connection 162 to multiplier 164 which is configured to multiply the waveform times the value on connector 165 which contains the reciprocal of the scaling factor used in multiplier 115. As can be appreciated by one ordinarily skilled in the art, this step removes the scaled factor from the final waveform. The signal is then transmitted across connection 166 to waveform generator 86. The waveform generator 86 is configured to offset the waveform introduced on line 113 an appropriate amount to match the frequency used by remote modem 7. The end result is a clock waveform on connection 92 that synchronously and smoothly tracks the frequency of remote modem 7.

OPERATION

The preferred use and operation of the synchronous clock regeneration system 100 and associated methodology are described hereafter.

Data is transmitted from remote modem 7 through network 11 to receiving modem 103. Receive interpolator/decimator 15 interpolates and/or decimates the data from the rate used by network 11 to the rate used by receiving modem 103. Subtractor 26 then subtracts the echo signal out of the interpolated and/or decimated data. The data then passes through filter 34 which filters out undesirable effects such as noise. A specified carrier frequency waveform is multiplied times the data by multiplier 38 before the data is passed into timing interpolator 44.

Timing interpolator 44 uses feedback signals from modulo subtractor 74 and delay integrator 68 to correct for any differences that may exist between the frequency used by receiving modem 103 and remote modem 7. The data is then transmitted out of timing interpolator 44 at the exact frequency used by receiving modem 103 to demodulate data, and the data is passed into equalizer demodulator 46 where the data is demodulated and passed out of the receiving modem 103 for processing.

The data transmitted out of timing interpolator 44 is also received by BTUD 54 which generates an error signal indicating the difference in signal rates used by remote modem 7 and receiving modem 103. This error signal is passed into synchronous clock regeneration system 100 where multiplier 115 scales the signal an appropriate amount to minimize quantization error. The scale of this signal is then removed by multiplier 122, and the resulting signal (matching the error signal generated by BTUD 54) is passed out of system 100. Multiplier 56 multiplies a value to this signal equivalent to the value of the sample rate used by modem 103 divided by the value of the symbol rate of modem 103. By techniques known in the art, adder 66, modulo subtractor 74 and delay integrator 68 use the signal transmitted out of multiplier 56 to generate the feedback signals used by timing interpolator 44 to correct for the timing differences between remote modem 7 and receiving modem 103.

The scaled signal transmitted out of multiplier 115 is not only received by multiplier 122, but it is also received by adder 117. Adder 117 also receives a stored signal from offset integrator 124 and combines this signal with the signal received from multiplier 115. The stored signal received by adder 117 is initially set to a value of zero. The combined signal is then transmitted out of adder 117 and into modulo subtractor 132 which subtracts the value of 2M from the combined signal if the combined signal is greater than the value of M. The signal is then transmitted out of modulo subtractor 132 and into offset integrator 124 where it is stored for use on the next symbol. In this way, offset integrator 124 continuously integrates the signals output by modulo subtractor 132 and outputs the current value of this integration to adder 117.

Not only is the signal output by modulo subtractor 132 received by offset integrator 124, but it is also received by multiplier 158 which multiplies a scaling factor ("C") to the received signal. The signal is then relayed to multiplier 164 which removes the scaling factor from multiplier 115 by multiplying the signal by the reciprocal of the value used in multiplier 115. The signal is then relayed to waveform generator 86 which also receives a supply signal from an independent source such as network 11. Waveform generator 86 then uses the signal from multiplier 166 to offset the supply signal an appropriate amount to match the frequency used by remote modem 7. Waveform generator then outputs a waveform with a frequency matching that of the frequency in remote modem 7. In this way, the synchronous clock regeneration system 100 of the present invention regenerates the clock waveform used by remote modem 7.

SOFTWARE

A possible software implementation of the present invention is as follows:

A possible software implementation of the present invention is as follows:
/************************************************************/
/*this is the part to update delay. first scale down the angle(phase2)
so that the update of angle and update of delay will have exactly the
same precision. then update delay and restore angle delta (phase 2)
to correct magnitude*/
/************************************************************/
```
up_delay:
        auc=0xe          /* disable overflow */
        a0=a1>>1
fsns:                    /*same scale as angle mult by 3 cause
                         sample at 72 but divide by two cause
                         scaled down*/
                         /*net is mult by 1.5*/
        r2=vf_baud       /* Test for 2743 baud */
        a1=*r2
        a1=a1>>1         /* Shift out carrier bit */
        y=5
        a1-y
        c0=0             /* Set c0=0 for all other rates */
        if ne goto fsns10
        c0=-5            /* Set c0=-5 for 2743 */
        a0=a0>>4         /* Divide angle by 16 */
fsns10:
        y=a0             /* a0 = phase error */
        a1=a0<<16
        y1=a1
        a0=a0+y          /* Multiply the 1/2 value by 3 */
        a0=a0+y          /* Result is 1.5 times */
        if c01t a0=a0<<4 /* Multiply by 16 if 2743 */
```
/************************************************************/
/* The following checks the transmit slave timing option. When not in*/
/* slave timing mode, the 0xc000 receive offset circuit is used to */
/* update the receive clock. When in slave timing mode, the 0xc000 */
/* transmit add/ delete circuit is used instead.     */
/************************************************************/
```
        if c11t goto slave_tim  /* Is transmit slave timing
                                 enabled ?*/
        r2=roffset       /* Update roffset        */
        a1=*r2++         /* Use phase offset/2 instead of */
        a11=*r2--        /* phase offset x1.5 */
        a1=a1+y
        *r2++=a1
        *r2=a11
        r2=delay
        y=*r2++
        y1=*r2--
updelay:
        a1=a0+y          /* Update delay    */
        *r2++=a1
        *r2--=a11
                         /*end of delay update section*/
                         /* Adjust the interpolator and compute*/
/***********************************************************
*/
/*  Adjust interpolator according to value in "delay"   */
/*                                                      */
/*  If delay > = .1 + .5 then                           */
/*  {                                                   */
/*      (add sample)                                    */
/*      delay = delay - 1.0                             */
/*      int_c0 = -2                                     */
/*      dir_ptr = 1                                     */
/*      skip_ec = -1                                    */
/*  }                                                   */
/*  Else if delay < -.1 - .5 then                       */
/*  {                                                   */
/*      (delete sample)                                 */
/*      delay = delay + 1.0                             */
/*      int_c0 = 0                                      */
/*      dir_ptr = 2                                     */
/*      skip_ec = 0                                     */
/*  }                                                   */
/*  Else                                                */
/*  {                                                   */
/*      (status quo)                                    */
/*      int_c0 = -1                                     */
/*      skip_ec = 0                                     */
/*  }                                                   */
/*  Then adjust receiver offset value in 0xc000 based on */
```

-continued

```
/*  new value of "delay"                                */
/*                                                      */
/*  Uses: a0, a1, y, r0, r1, r2, j, k.                  */
/************************************************************/
intadj:                  /* adjust interpolator   */
        r1=delay         /* Load 16 bits(delay,a0) */
        a0=*r1           /* (low half of "delay" not changed.) */
        j=-1             /* Default value for c0 if status quo. */
*/
        y=.5+.1          /*.1 = guard band        */
        a1=a0+y
        if mi goto del_sam_2
        a1=a0-y
        if mi goto status_quo_2
add_sam_2:               /* add sample            */
        y=-1.0           /* add -1 to delay       */
        j=-2             /* value for c0          */
        r0=1             /* dir_ptr value         */
        goto endtime1
del_sam_2:               /* delete sample         */
        y=1.0            /* add +1 to delay       */
        j=0              /* value for c0          */
        r0=2             /* dir_ptr value         */
endtime1:
        a0=a0+y          /* Add +/-1 sample to delay. */
                         /* Save in "delay" down below. */
        r2=dir_ptr       /* Write direction pointer   */
        *r2=r0
status_quo_2:
        r2=int_c0        /* Save value for c0     */
        *r2=j
        *r1=a0           /* Save high part of delay */
```
/*------------------------------------------------------------*/
/*                                                             */
/*  Scale the delay value to write to 0xc000 based on samples */
/*  perbaud.                                                   */
/*       2048 x fs                                             */
/*       --------- = (# samples/baud) x (2048/3)               */
/*          3 x fb                                             */
/*                                                             */
/*       MULTIPLIER                                            */
/*  Decimal  Hex      Samples/Baud   Baud Rate   Sample Rate  */
/*                                                             */
/*  1365     0x555    2              4800        9600          */
/*  2048     0x800    3              3200        9600          */
/*  2048     0x800    3              2400        7200          */
/*  3072     0xc00    4.5            1600        7200          */
/*  4096     0x1000   6              1200        7200          */
/*                                                             */
/*------------------------------------------------------------*/
```
mod_roff:                /* Operation for modulo subtractor */
        r1=roffset
        a0=*r1           /* Load upper half of roffset */
        r2=roff_limit    /* Read symbol rate limit */
        y=*r2++
        a0=a0
        if p1 goto mod_roff10
        a1=a0+y
        if mi goto mod_roff30
        goto mod_roff50
mod_roff10:
        a0-y
        if mi goto mod_roff50
mod_roff20:
        y=*r2++          /* Subtract adjustment */
        a0=a0-y
        goto mod_roff50
mod_roff30:
        y=*r2++          /* Add adjustment */
mod_roff40:
        a0=a0+y          /* Add adjustment to roffset */
mod_roff50:
        *r1=a0           /* Save high part of roffset */
        x=*r1
        r2=adscale       /* Scale value           */
        y=*r2
adsc:
        p=x*y
        a0=p
        if c01t a0=a0<<4 /* Multiply by 16 if 2743 */
```

-continued

```
pdx0=0x20|0xc000 | 0x40
 4*;
pdx1=a0
a0=a0>>8
 3*;
pdx1=a0
 ;
        /* the receive offset value for the  */
        /* 0xc000 receive clock circuit.   */
        /* This is done when in either internal or */
```

END OF CODE

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Finally, in the claims hereafter, it should be emphasized that the structure, materials, acts, and equivalents of all "means" elements, "logic" elements, and steps are intended to include any structures, materials, or acts for performing the functions specified in connection with said elements.

It is claimed:

1. A synchronous clock regeneration method for generating a clock waveform at a first frequency, the system comprising;
   an adder configured to combine an error signal with an offset signal to generate a combined signal;
   a modulo subtractor configured to receive said combined signal, to compare a value of said combined signal with a threshold value, and to transmit an output signal based on said value of said combined signal, said modulo subtractor further configured to mathematically combine said value of said combined signal with a predetermined value when said value of said combined signal is outside a predetermined range defined by said threshold value;
   an offset integrator configured to receive said output signal and to output said offset signal; and
   a waveform generator configured to receive said output signal and to generate said clock waveform at said first frequency.

2. The system of claim 1, wherein said clock waveform is generated within a receiving modem and said first frequency is a frequency of a remote modem.

3. The system of claim 1, wherein said waveform generator is further configured to receive a source waveform at a second frequency.

4. The system of claim 3, wherein said second frequency is a frequency of a network.

5. The system of claim 1, further comprising a first multiplier configured to multiply a scaling factor to said error signal.

6. The system of claim 5, further comprising a second multiplier configured to multiply a reciprocal of said scaling factor to said output signal.

7. The system of claim 1, wherein said modulo subtractor, in mathematically combining said value of said combined signal with said predetermined value, adds said predetermined value to said value of said combined signal.

8. The system of claim 1, wherein said modulo subtractor, in mathematically combining said value of said combined signal with said predetermined value, subtracts said predetermined value from said value of said combined signal.

9. A synchronous clock regeneration method for generating a clock waveform at a frequency, comprising the steps of:
   receiving an error signal;
   combining a value from said error signal with a value in an offset integrator to form a first combined value;
   comparing said first combined value to a threshold value;
   determining whether said first combined value is within a predetermined range defined by said threshold value based on said comparing step;
   mathematically combining, in response to said determining step, said first combined value with another value to form a second combined value if said first combined value is outside said predetermined range;
   transmitting said first combined value to said offset integrator if said first combined value is within said predetermined range;
   transmitting said second combined value to said offset integrator if said first combined value is outside of said predetermined range;
   updating said value in said offset integrator; and
   transmitting a signal having a value derived from said first combined value to a waveform generator.

10. The method of claim 9, wherein updating said value in said offset integrator includes the step of adding one of said combined values to said value in said offset integrator.

11. The method of claim 9, further comprising the step of multiplying said error signal by a scaling factor.

12. The method of claim 9, further comprising the step of multiplying one of said combined values by a scaling factor.

13. The method of claim 9, further comprising the step of performing said mathematically combining step by adding said first combined value with said other value.

14. The method of claim 9, further comprising the step of performing said mathematically combining step by subtracting said other value from said first combined value.

15. A synchronous clock regeneration system for generating a clock waveform at a first frequency, the system comprising:
   an adder configured to combine an error signal with an offset signal to generate a combined signal;
   an offset integrator configured to receive said combined signal and to output said offset signal;
   a waveform generator configured to receive said combined signal and to generate said clock waveform at said first frequency;
   a first multiplier configured to multiply a scaling factor to said error signal; and
   a second multiplier configured to multiply a reciprocal of said scaling factor to said combined signal.

16. The system of claim 15, wherein said clock waveform is generated within a receiving modem and said first frequency is a frequency of a remote modem.

17. The system of claim 15, further comprising a modulo subtractor configured to receive said combined signal and to subtract a predetermined value from said combined signal if said combined signal is greater than a first threshold value.

18. The system of claim 17, wherein said modulo subtractor is further configured to add said predetermined value to said combined signal if said combined signal is less than a second threshold value.

19. A synchronous clock regeneration method for generating a clock waveform at a frequency, comprising the steps of:
   receiving an error signal;

combining said error signal to a value in an offset integrator to form a combined value;

updating said value in said offset integrator;

transmitting said combined value to a waveform generator; and multiplying said combined value by a scaling factor.

20. The method of claim 19, further comprising the step of subtracting a predetermined value from said combined value if said combined value is greater than a first threshold value.

21. The method of claim 20, further comprising the step of adding said predetermined value to said combined value if said combined value is less than a second threshold value.

22. A computer-readable medium having a computer program, said computer program programmed to perform the following steps:

combining a value from an error signal with a value in an offset integrator to form a first combined value;

comparing said first combined value to a threshold value;

determining whether said first combined value is within a predetermined range defined by said threshold value based on said comparing step;

mathematically combining, in response to said determining step, said first combined value with another value to form a second combined value when said first combined value is outside said predetermined range;

transmitting said first combined value to said offset integrator if said first combined value is within said predetermined range;

transmitting said second combined value to said offset integrator if said first combined value is outside of said predetermined range;

updating said value in said offset integrator; and transmitting a signal having a value derived from said first combined value to a waveform generator.

* * * * *

UNITED STATES PATENT AND TRADEMARK OFFICE
CERTIFICATE OF CORRECTION

PATENT NO. : 5,982,826
DATED : November 9, 1999
INVENTOR(S) : Betts, et al.

It is certified that error appears in the above-identified patent and that said Letters Patent is hereby corrected as shown below:

Col. 11, line 27, delete "method" and replace with -- system --.

Signed and Sealed this

Seventh Day of November, 2000

Attest:

Q. TODD DICKINSON

*Attesting Officer*  *Director of Patents and Trademarks*